June 21, 1938.   E. F. JACKMAN   2,121,197
SCREW EXTRACTOR
Filed July 1, 1936   2 Sheets-Sheet 1

Inventor
ELMER F. JACKMAN
By
Attorney.

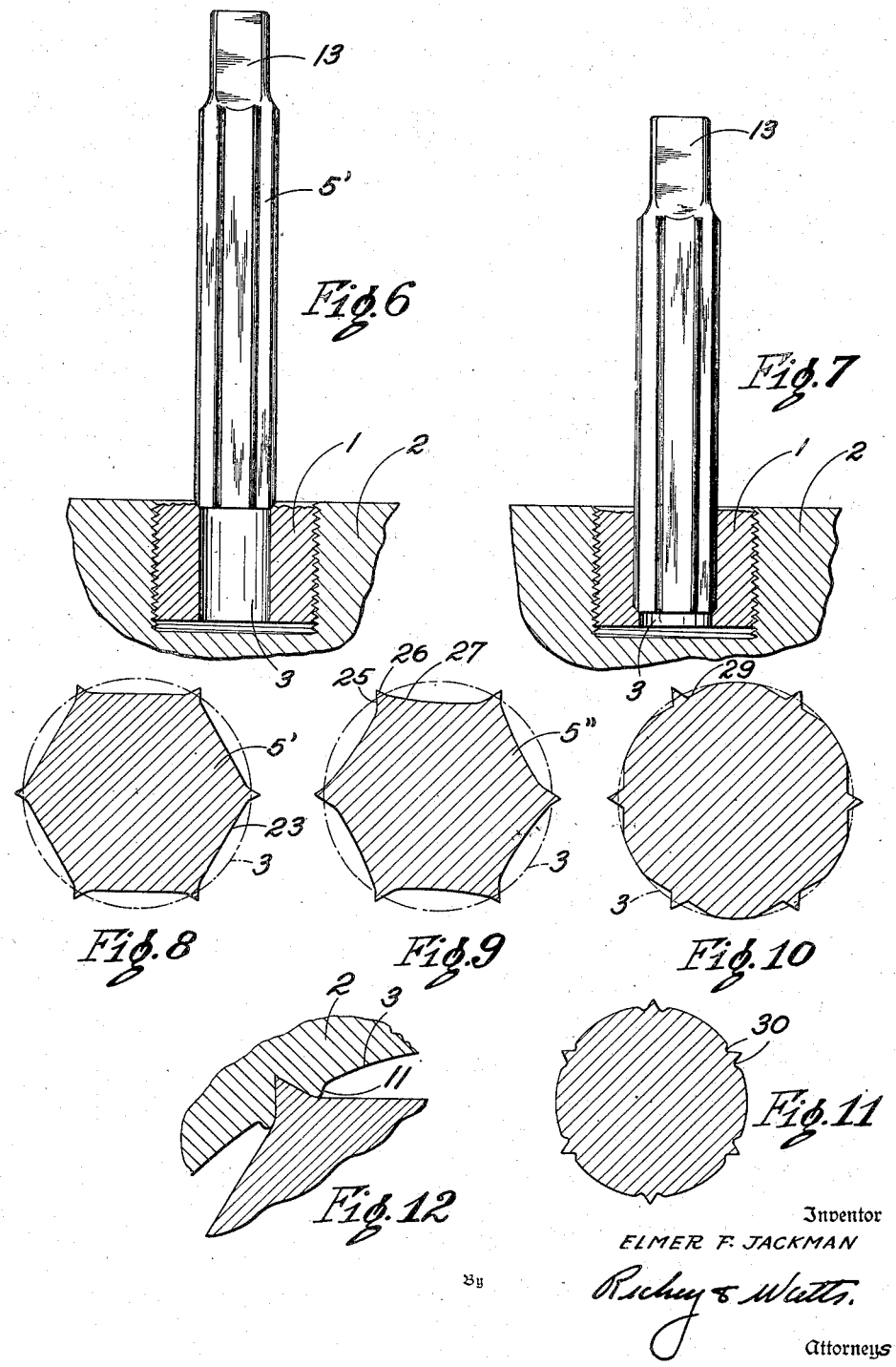

Patented June 21, 1938

2,121,197

UNITED STATES PATENT OFFICE 2,121,197

SCREW EXTRACTOR

Elmer F. Jackman, Lakewood, Ohio, assignor to The Ridge Tool Company of Elyria, North Ridgeville, Ohio, a corporation of Ohio Application July 1, 1936, Serial No. 88,425

4 Claims. (Cl. 81—71)

This invention relates to improvements in extractors particularly adapted for removing the embedded parts of broken stud bolts and the like which have had their heads or ends broken off.

Heretofore there have been many stud extractors, the most common type of which had tapered shanks with reversely twisted flutes and ribs. The end is usually provided with a square for receiving a wrench. Practically all of the extractors are operated by drilling a hole in the object to be removed, when there is no hole, and inserting the extractor in the hole and turning the extractor with a wrench. The ribs grip the edges of the hole and the broken stud is thus unscrewed. There are, however, times when the extractor fails to remove the broken stud, particularly when it has become rusted in position. The cause of the failure is often due to the extractor failing to obtain sufficient grip upon the stud.

Another common cause for failure is because the tapered extractors have a spreading action upon the object being removed and hence the bore in the article must be relatively small to leave a large and strong wall thickness. Obviously then the extractor must be relatively small and when the small extractor is used it becomes wedged in the bore and breaks off before sufficient torque can be applied to remove the stud. The short zone of engagement, usually at the edge of the bore, being of insufficient length to permit the necessary torque to be applied, the result being that the extractor merely mutilates the edge of the bore.

In the extractor of my present invention I have eliminated a great many of the defects of the prior art devices and have provided an extractor which will readily remove studs that were heretofore extremely hard or impossible to remove. This is accomplished by providing an increased area of gripping surfaces which allows more torque to be applied and which does not cut or mutilate the bore in the stud or nipple.

The tightest gripping thread is easier to remove if the wall of the stud can be reduced to a mere shell, as contemplated in the present invention, and still permit an extractor to be used which has a grip upon the shell that does not expand the shell. In drilling out the stud for my extractor, the hole may be drilled entirely through the stud and of such size as to remove substantially 90% of the metal. Removing this metal makes the stud much easier to remove and permits a large diameter tool to be used which cannot break.

Another feature of the invention resides in providing a means whereby the torque applied by a wrench to the extractor can be applied at a point close to the point of greatest resistance rather than at the extremity, lessening the tendency for the device to break and increasing the efficiency with which the torque is applied. Furthermore the construction is such that should the device be broken it is still capable of being used as an extractor by a very simple grinding operation. Certain economies in manufacture will also be apparent.

Still other advantages of the invention, and the invention itself, will become more apparent from the following description of some embodiments thereof, which description is illustrated by the accompanying drawings.

In the drawings:

Fig. 6 is an elevational view of a modified form showing the same prior to insertion in a stud;

Fig. 7 is a similar view to Fig. 6 showing the device after insertion;

Figs. 8, 9 and 10 are enlarged cross sectional views of modified forms of the invention, showing in dotted lines the bore into which they are adapted to be driven;

Fig. 11 is a cross section of another modified form; and

Fig. 12 is an enlarged cross section of a portion of an extractor showing the effect of its engagement in a bore.

Figure 1:
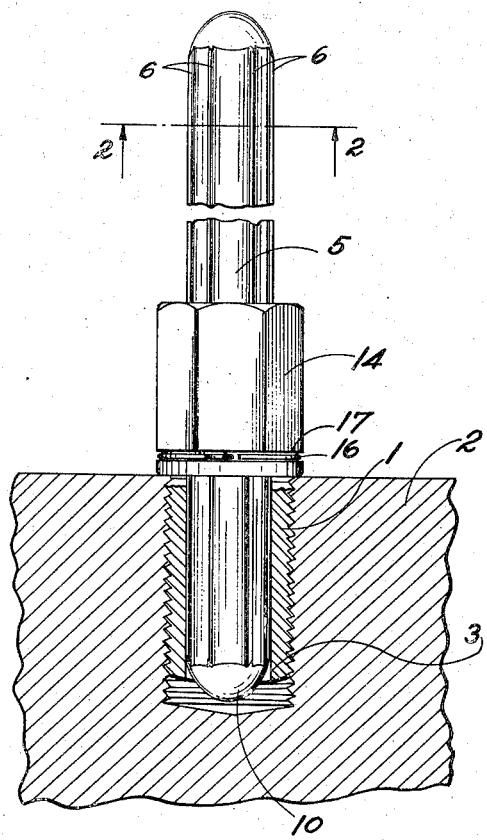
Fig. 1 is an enlarged elevational view of an extractor embodying my invention, showing the same in position in a broken stud, the stud and container being shown in section.

As best shown in Fig. 1, there is illustrated the end of a stud 1 which is broken off in a threaded aperture of a member 2 and which piece of stud is to be removed. A bore 3 is first drilled through the remaining end of the stud, into which the tool of my invention may be driven to permit the stud end to be unscrewed.

The tool in the preferred form of my invention, comprises an elongated cylindrical shank 5 having straight ribs 6 extending longitudinally along the shank and parallel to each other. The ribs may be of varying number and comprise opposed faces 7, each of which subtends at an angle a of substantially greater than 90° to a tangent to the cylindrical body at the base of the rib. The two faces meet in an apex at the extremities of the rib. The end of the tool is ground, as best shown at 10 in Fig. 1, to a substantially semi-spherical form to provide a self-centering point for starting the tool into the bore.

The diameter of the bore is slightly larger than the diameter of cylindrical shank to provide a slight clearance between the body and the bore when the tool is driven therein so that the ribs engage the material at the side of the bore and provide their own paths or grooves when the tool is driven into the bore, and the material may be displaced laterally as at 11, Fig. 12.

The shank being cylindrical and the ribs straight and parallel, and the bore being cylindrical, the ribs will engage the walls of the bore for the entire length of the inserted part, and in some instances for the entire length of the bore, depending upon the length of insertion of the tool. The tool may in some instances be driven through the stud so that it bottoms in the threaded aperture without detrimentally affecting the operation of the device.

As best shown in Figs. 6 and 7, the tools may be provided, particularly in the larger sizes, with squared ends 13 for the reception of a suitable wrench for applying torque to the tool for operating the same.

Figure 3:
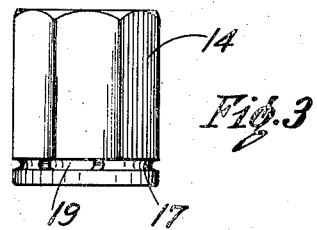
Fig. 3 is an enlarged elevational view of the torque applying member for the extractor with the friction spring removed.
Figure 5:
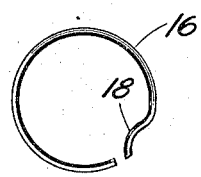
Fig. 5 is a plan view of the friction spring for the torque applying member.
Figure 4:
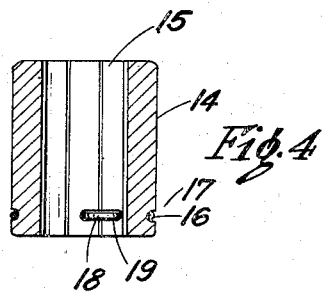
Fig. 4 is a vertical section through the torque applying member of Fig. 3, showing the friction spring in place.

For the smaller sized tools, however, I provide a torque-transmitting member for turning the extractor, which comprises a hexagonal slide 14, as best shown in Figs. 3 and 4 for receiving the wrench, and provided with a central bore 15 conforming to the exterior surface of the extractor, and being slidable longitudinal of the extractor. Obviously the same type of slide can also be used on the larger sizes of extractor if desired.

Means is provided for retaining the slide upon the extractor in the desired position, which comprises a circular spring member 16 disposed in a groove 17 adjacent the end of the extractor. The spring has an inwardly extending portion 18 adapted to protrude through an aperture 19 into the slide and contact with the exterior of the extractor. The spring bearing against the side of the extractor pulls the opposite side of the slide against the extractor and thus supplies frictional engagement to keep the slide in any desirable position.

The tool having been driven home in the bore, the slide is slid down as far as possible to the stud to be removed and a wrench applied to the hexagonal exterior surface of the slide through which torque is transmitted to the tool. This is of considerable advantage, especially in small tools inasmuch as the springiness of the material of which the extractor is made, tends to prevent some of the tools from properly withdrawing the studs. Applying the greatest torque at the place, as indicated by the position of the slide in Fig. 1, places the torque nearest to the greatest point of resistance, tending to eliminate breakage.

In the use of small size extractors for removing small studs, the torque slide is particularly desirable since it furnishes a large grip for the turning wrench and also makes it unnecessary to grind the square on the end of the tool as in Fig. 6 for reception of a wrench and hence weaken the shank.

The ribs having cut their own grooves into the material of the stud provide a long gripping surface; the frictional engagement thus gained is so great that the most stubborn cases are relatively easy to remove. Inasmuch as the force applying face is at an obtuse angle to the direction of rotation there is not the tendency for the tool to cut and remove chips, as is the common experience in the ordinary type of extractors, and since the cylindrical body substantially fills the bore there is no place for material to go which may have a tendency to be removed.

By providing the extractor with longitudinally extending ribs or uniformity throughout its length, in event of breakage the large remaining piece may readily have its broken end ground as on the original device, and the extractor again used in the usual manner. This re-grinding process can be continued until the extractor becomes too short for further value.

In Figs. 6 and 7 there are shown two views of one of the larger size extractors prior to and after insertion in the bore of a stud. It will be noted that the bore of the stud is substantially smaller than the diameter through the apexes of the ribs, and that the ribs therefore must cut their own way into the wall of the stud. Thus the extractor provides a very long grip with the object to be removed as in Fig. 1. In the larger sizes of extractors the slide may be eliminated, the end being ground to a square as shown at 13. The end 21 is beveled to provide a starting surface.

Fig. 8 shows an extractor having a cross section where the body 5' is hexagonal in shape and the ribs are formed at the intersection of the hexagonal faces 23.

Figure 2:
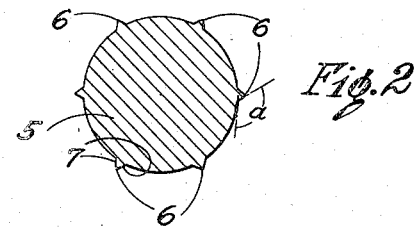
Fig. 2 is a section taken on the line 2—2 of Fig. 1.

The junction of the faces of the ribs is an acute angle and the junction of the faces of the ribs with the body of the extractor faces an obtuse angle, the angles on each side being substantially the same, the contour of the ribs being substantially the same as in Figs. 1 and 2. The face of the rib, which is the driving face for the object being removed, is at an angle of greater than 90° to the direction of rotation of the article being removed.

In Fig. 9 there is shown in cross section a modified structure which is very similar to Fig. 8 except that the body 5" is slightly smaller and the ribs are so placed at the intersection of the faces that the leading face 25, the tool being adapted particularly for removing studs or the like having right hand threads, is somewhat longer than the following face 26. This provides a removing rib having a large area for exerting force and backed up to a greater extent by the wall 27 of the body.

Fig. 10 is a cross sectional view of a device substantially like that in Figs. 1 and 2 except that the body of the tool is cut away at the base of each rib along a cord 29 of the body to provide greater room for displacement of the material of the stud.

Fig. 12 is an enlarged view of the device of Fig. 8 showing how the flutes displace the wall of the stud to be removed.

Fig. 11 is substantially the same as Fig. 10 except that instead of a flat surface, a groove 38 on each side of the ribs is provided to permit the material of the stud being removed to be displaced and enter therein.

In manufacturing this device, particularly that of Fig. 1, it is readily made from stock formed in the desired configuration of cross section in relatively long lengths, after which the desired sizes of sections may be severed therefrom and the insertion ends properly trimmed to provide the individual extractors. This results in considerable economy since machining operations are practically eliminated.

Having thus described my invention I am aware that numerous and extensive departures may be made therefrom but without departing from the spirit of the invention.

I claim:

1. An extractor for removing threaded objects from threaded engagement in a bore or the like comprising a body of cylindrical form throughout its length and of a diameter providing a sliding fit with an axial bore in the object to be removed, a plurality of straight bore-engaging ribs of V-shaped cross-section and uniform height extending longitudinally throughout the length of the body and adapted to be driven into the wall of said bore in the object to be removed.

2. An extractor for removing threaded objects from threaded engagement in a bore or the like comprising a body of cylindrical form throughout its length and of a diameter providing a sliding fit with an axial bore in the object to be removed, a plurality of straight bore-engaging ribs of V-shaped cross section and uniform height extending longitudinally throughout the length of the body and adapted to be driven into the wall of said bore in the object to be removed, a torque transmitting member having a bore conforming to the exterior surface of said body and slidable longitudinally thereon, and an exterior surface on said member for application of a wrench to permit the torque applied to the body to be localized near the point of greatest resistance.

3. An extractor for removing threaded objects from threaded engagement in a bore or the like comprising a body of cylindrical form throughout its length and of a diameter providing a sliding fit with an axial bore in the object to be removed, a plurality of straight bore-engaging ribs of V-shaped cross-section and uniform height extending longitudinally throughout the length of the body and adapted to be driven into the wall of said bore in the object to be removed, a torque transmitting member having a bore conforming to the exterior face of said body and slidable longitudinally thereon, and an exterior surface on said member for application of a wrench to permit the torque applied to the body to be localized near the point of greatest resistance, friction means carried by the sleeve to maintain the same in the desired longitudinal position on said body, comprising a spring having an end adapted to extend through the sleeve and engage the surface of the body.

4. In an extractor for studs, nipples or the like comprising an elongated cylindrical shank adapted to be disposed in a bore formed in the object to be removed, the body of said shank being of a size to substantially fill the bore, a plurality of straight ribs disposed about the straight surface of the shank extending longitudinally along the shank and parallel to each other, each rib having two oppositely disposed faces meeting at an edge, and each face disposed at an angle of greater than 90° to the axis of rotation, and adapted to be driven into the wall of said bore, a torque transmitting member for said shank comprising a hexagonal sleeve having a bore through it conforming to the surface of the shank and adapted to slide freely upon the shank, a circumferential groove disposed about said sleeve adjacent one end thereof, and an aperture formed in said groove extending into the bore of the sleeve, a spring member seated in said groove, and having an end extending through said opening into said bore, and adapted to engage said shank and hold the sleeve in frictional sliding engagement with said shank.

ELMER F. JACKMAN.